US012710119B2

(12) United States Patent
von Breitenbach et al.

(10) Patent No.: US 12,710,119 B2
(45) Date of Patent: Aug. 18, 2026

(54) PROFILED CLAMP

(71) Applicant: NORMA Germany GmbH, Maintal (DE)

(72) Inventors: Gerrit von Breitenbach, Maintal (DE); Belal Akremi, Berkshire (GB); Tatjana Rumbauskiene, Berkshire (GB); Mateusz Jarosz, Berkshire (GB); Jorge Marques, Berkshire (GB)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 18/274,330

(22) PCT Filed: Jul. 27, 2021

(86) PCT No.: PCT/EP2021/070978

§ 371 (c)(1),
(2) Date: Jul. 26, 2023

(87) PCT Pub. No.: WO2022/161649

PCT Pub. Date: Aug. 4, 2022

(65) Prior Publication Data

US 2024/0077157 A1 Mar. 7, 2024

(30) Foreign Application Priority Data

Jan. 26, 2021 (DE) ..................... 10 2021 101 692.4

(51) Int. Cl.
*F16L 23/08* (2006.01)

(52) U.S. Cl.
CPC .................................... *F16L 23/08* (2013.01)

(58) Field of Classification Search
CPC .......... F16L 23/08; F16L 21/06; F16L 21/065
See application file for complete search history.

(56) References Cited

U.S. PATENT DOCUMENTS 2,897,569 A 8/1959 Kastner
4,047,683 A 9/1977 Takeuchi
(Continued)

FOREIGN PATENT DOCUMENTS

CN 104864184 A 8/2015
CN 108700236 A 10/2018
(Continued)

OTHER PUBLICATIONS

German Office Action for German Application No. 10 2021 101 692.4 dated Oct. 7, 2021 (4 pages).
(Continued)

*Primary Examiner* — Matthew Troutman
*Assistant Examiner* — James A Linford
(74) *Attorney, Agent, or Firm* — REISING ETHINGTON, P.C.

(57) ABSTRACT

A clamp having a first profiled clamp half and a second profiled clamp half. Two flange parts can be connected to one another with the application of an axial force. A first tightening head is formed at one end of the first clamp half and a second tightening head is formed at one end of the second clamp half in order to form a tightening device. The ends of the clamp halves which are located opposite the tightening heads are connected to one another by means of an articulated connection. The articulated connection is formed from a mechanically machined or formed flat strip section.

11 Claims, 7 Drawing Sheets

(56) References Cited

U.S. PATENT DOCUMENTS

| | | | | |
|---|---|---|---|---|
| 7,300,078 | B2 | 11/2007 | Yamamoto et al. | |
| 10,982,801 | B2 | 4/2021 | Lecbych et al. | |
| 2007/0176425 | A1* | 8/2007 | Ma | F16L 21/065 285/406 |
| 2015/0240845 | A1 | 8/2015 | Mann et al. | |
| 2019/0145559 | A1 | 5/2019 | Karlsson | |
| 2020/0309294 | A1* | 10/2020 | Jardim | F01N 13/1805 |
| 2021/0310584 | A1* | 10/2021 | Koehler | F16L 23/08 |

FOREIGN PATENT DOCUMENTS

| | | | | | |
|---|---|---|---|---|---|
| CN | 109477601 | A | | 3/2019 | |
| DE | 29816889 | U1 | | 11/1998 | |
| DE | 102005035198 | A1 | | 3/2006 | |
| DE | 102016103988 | A1 | | 9/2017 | |
| DE | 102019118166 | A1 | | 1/2021 | |
| EP | 0403379 | A1 | | 12/1990 | |
| EP | 2584240 | A1 | * | 4/2013 | F16L 23/08 |
| GB | 2446813 | A | * | 8/2008 | F16L 23/04 |
| JP | 2006038142 | A | | 2/2006 | |
| JP | 2011052826 | A | | 3/2011 | |
| JP | 2019510177 | A | | 4/2019 | |
| KR | 20110025093 | A | | 3/2011 | |
| KR | 20180121955 | A | | 11/2018 | |
| WO | WO2008102116 | A2 | | 8/2008 | |
| WO | WO2018140916 | A1 | | 8/2018 | |

OTHER PUBLICATIONS

International Search Report for International Application No. PCT/EP2021/070978 dated Oct. 18, 2021 (4 pages).

English Translation of International Search Report for International Application No. PCT/EP2021/070978 dated Oct. 18, 2021 (2 pages).

Korean Office Action for Korean Application No. 10-2023-7019048 dated Dec. 18, 2024 (10 pages).

Japanese Office Action for Japanese Patent Application No. 2023-541709 dated Aug. 6, 2024 (9 pages).

English Translation of Japanese Office Action for Japanese Patent Application No. 2023-541709 dated Aug. 6, 2024 (12 pages).

European Office Action for European Patent Application No. 21749624.9 dated Jan. 2, 2025 (9 pages).

Chinese Office Action for Chinese Application No. 202180076096.8 dated Apr. 17, 2026 (11 pages).

* cited by examiner

PROFILED CLAMP

INTRODUCTION

The disclosure relates to a profiled clamp having a first profiled clamp section and a second profiled clamp section, and optionally at least one further profiled clamp section.

Profiled clamps are reliable and known connecting elements for use in industry and automotive engineering. Profiled clamps are provided, for example, for the fluid-tight connection of two axially abutting tube or hose ends, which usually have radially outwardly directed connecting flanges. The profiled clamp is then placed on the corresponding flanges, and radial and axial holding forces are introduced by tightening the profiled clamp.

WO 2008/102116 A2 discloses a profiled clamp which has two profiled clamp halves. The profiling of the clamp halves is designed in such a way that a triangular, roof or trapezoidal shape is used to connect two flange parts to one another. When a circumferential force is applied to the clamp halves, the two flange parts are connected to one another, with an axial force being produced. The profiled clamp has a tightening device, which is formed by a first tightening head and a second tightening head, wherein the tightening heads are each formed at one end of one of the clamp halves. The two tightening heads are connected to one another by a screw element, and therefore the profiled clamp is tightened by tightening the screw element.

The two clamp halves are connected to one another diametrically opposite the tightening device by a connecting element, which is often made of a spring steel material. The connecting element is welded to the respective end sides of the clamp halves. The resilient properties of the connecting element give rise to an articulated connection between the two clamp halves, ensuring that these can be moved to and fro during the mounting of the clamp and are permanently connected to one another.

DE 10 2016 103 988 A1 describes a further example from the prior art, which is also shown in FIG. 1. The first clamp half 10 and the second clamp half 11 are connected to one another in an articulated manner by an articulated connection 14 in the form of a flat strip section 15. The flat strip section 15 merges in one piece and in a materially homogeneous manner into the respective clamp halves 10 and 11. There is a central hole 26 in the flat strip section 15. The flat strip section 15 is of flexible design, enabling the two clamp halves 10 and 11 to be moved toward and away from one another without damaging the flat strip section 15 or requiring excessive forces. When the nut 20 is tightened on the screw element 18, the two pressure lugs 19 come into contact with one another.

SUMMARY

An object of the disclosure, per at least one embodiment, is to develop a profiled clamp for connecting two flange parts with the application of the highest possible axial force. In addition, one intention of at least one embodiment is to simplify the design of the profiled clamp, with the result, in particular, that the profiled clamp can be produced in a simpler manner and consists of a small number of individual parts.

The profiled clamp according to an embodiment has a first profiled clamp section, a second profiled clamp section and optionally at least one further profiled clamp section, by means of which two flange parts can be connected to one another with the application of an axial force. The profiled clamp according to the embodiment has two or three profiled clamp sections. A first tightening head is formed at one end of the first clamp section and a second tightening head is formed at one end of the second clamp section in order to form a tightening device. The ends of the clamp sections which are located opposite the tightening heads are connected to one another by means of an articulated connection, or the ends of the clamp sections which are located opposite the tightening heads are connected to a further clamp section by means of articulated connections. The articulated connection is formed by means of a mechanically machined or formed flat strip section which is connected in one piece to the clamp sections and has a defined flexibility.

In a first embodiment, the profiled clamp has two profiled clamp sections and has a first profiled clamp half and a second profiled clamp half, by means of which two flange parts can be connected to one another with the application of an axial force. A first tightening head is formed at one end of the first clamp half and a second tightening head is formed at one end of the second clamp half in order to form a tightening device, wherein the ends of the clamp halves which are located opposite the tightening heads are connected to one another by means of an articulated connection. The articulated connection is formed by means of a mechanically machined or formed flat strip section which is connected in one piece to the clamp halves and has a defined flexibility, wherein the flexibility is increased by the mechanical machining or forming in comparison with an unprocessed flat strip section.

In an alternative second embodiment, the profiled clamp has three profiled clamp sections. The first profiled clamp section is connected to a first end of a third profiled clamp section by means of a first articulated connection at the end of the first clamp section which is located opposite the tightening head, and the second profiled clamp section is connected to a second end of a third profiled clamp section by means of a second articulated connection at the end of the second clamp section which is located opposite the tightening head.

In a further embodiment, the profiled clamp can also be embodied with 4 or more clamp sections, wherein the clamp sections, apart from the first and the second clamp section, are each connected at both ends to the adjacent clamp sections by means of an articulated connection.

The material of the flat strip section merges in one piece, i.e. integrally and homogeneously, into the material of the clamp halves, with the result that both clamp halves are connected to one another in one piece or integrally. In one embodiment, the profiled clamp, including the tightening head, consists of a single piece of strip material.

The mechanical machining or forming of the flat strip section leads to an increase in flexibility in the region of the articulated connection. Suitable methods for mechanical machining or forming are, for example, bending, stamping, hammering, rolling, and cutting methods, preferably milling, bending, rolling or grinding. By means of the thinning of the material involved in the cutting methods or the geometric change involved in bending, it is possible to achieve a defined stiffness, and flexibility is increased as compared with the unprocessed flat strip section. This permits mounting of the profiled clamp, preferably by hand, without mechanical aids.

In one variant, the increase in flexibility is achieved by material thinning, for example by stamping, hammering, rolling or cutting methods, in particular milling or grinding. In this embodiment, the processed flat strip section has a reduced material thickness in the sheet thickness direction, transversely to the circumferential direction, when compared with the clamp halves. The flat strip section has a stamped feature or milled feature, by means of which the reduced material thickness was produced. The flat strip section has the reduced material thickness at least in a partial region in the circumferential direction of the clamp strip, preferably centered, or over the entire length of the flat strip section. For example, the flat strip section has a reduced material thickness over its entire length. In one variant, the material thinning is achieved by elongation of the material, for example by rolling or stamping the flat strip section. In this case, the flat strip section is not only thinned but also lengthened in comparison with the unprocessed material section which has not yet been thinned. Alternatively, the flat strip section has one or more notches as a material thinning. The notches preferably have a V-shaped cross section or a U-shaped cross section. It is also possible to combine both cross-sectional shapes. The notches each extend transversely to the circumferential direction of the clamp over the entire material width of the flat strip section. The notches do not penetrate the sheet thickness but take material from the upper side of the flat strip section and thereby thin it. In this embodiment, the underside of the flat strip section remains unchanged and has no notches.

In another variant, the increase in flexibility is achieved by changing the geometry of the flat strip section, for example by bending the flat strip section. In this variant, the mechanically machined or formed flat strip section has a radially outwardly or axially inwardly bent formation, the bent formation having a U-shaped or V-shaped cross section.

According to at least one embodiment, it is also possible to combine both variants, with the result that the flat strip section has a material thinning and a geometric change in the flat strip section. The material thinning can also be in the form of a U-shaped or V-shaped cross section and not extend over the entire length of the flat strip section. The specific material thinning can be introduced both in the direction of the radially inwardly or radially outwardly directed side of the flat strip section.

According to at least one embodiment, "inwardly" is understood to mean directed toward the center of the profiled clamp. According to at least one embodiment, "outwardly" is understood to mean out of the profiled clamp, away from the center. In the "axial" direction means aligned along the longitudinal axis, wherein the longitudinal axis extends in the direction of the tubes to be connected through the center of the circle of the profiled clamp.

The clamp sections or clamp halves are designed as inwardly open hollow profiles and preferably have a trapezoidal, triangular or roof structure. The total area of the clamp sections or clamp halves is obtained when the trapezoidal, triangular or roof structure of the clamp halves is developed into a flat structure. The total area thus formed has a greater width than the width of the flat strip section. If the edges of the flat total area are bent over to form the clamp sections or clamp halves in order to produce the triangular, trapezoidal or roof shape, then the taper of the flat strip section can be dimensioned in such a way that a constant width of the profiled clamp is obtained between the clamp sections and the flat strip section—in the radially projected view, although the flat strip section has no profiling.

The articulated connection is formed from a flat strip section with an axially outwardly or axially inwardly bent formation, the formation having either a U-shaped or a V-shaped profile. The flat strip section has no profiling and is flat transversely to the circumferential direction of the clamp sections. The bending of the flat strip section takes place about the axis of the transverse direction of the flat strip section. The longitudinal sides of the flat strip section are not bent relative to one another, which is why the latter is referred to as being flat in the axial direction.

The flat strip section is a section with an extent in the circumferential direction. In one variant of the profiled clamp, the flat strip section has a taper formed by lateral edge incisions relative to the total area of the profiled clamp halves.

In one embodiment of the flat strip section with a geometric change, the flat strip section has a radially outwardly bent formation. The radially outwardly bent formation has a U-shaped cross section or a V-shaped cross section. Radially outwardly bent means that the flat strip section is at a greater distance from the longitudinal axis in the region of the formation than in the region which is not bent.

In a further embodiment of the flat strip section with a geometric change, the flat strip section has a radially inwardly bent formation. The radially inwardly bent formation has a U-shaped cross section or a V-shaped cross section. Radially inwardly bent means that the flat strip section is at a smaller distance from the longitudinal axis in the region of the formation than in the region which is not bent.

In an embodiment of the flat strip section with a geometric change, the bent formation has a U-shaped cross section, preferably in the form of a symmetrical U-profile. In one variant, the flat strip section can be formed from three sections. The flat strip section then has a first flat section, a second flat section and a formation bent in a U shape, wherein the U-shaped formation connects the two flat sections to one another. The two flat sections are each integrally formed on one of the two clamp halves.

In a further embodiment of the flat strip section with a geometric change, the bent formation has a V-shaped cross section, preferably in the form of a symmetrical V-profile. In one variant, the flat strip section can be formed from three sections. The flat strip section then has a first flat section, a second flat section and a formation bent in a V shape, wherein the V-shaped formation connects the two flat sections to one another. The two flat sections are each integrally formed on one of the two clamp halves.

In the case of an embodiment with three sections, the flat strip section is designed as follows: a first flat section is integrally formed on a first clamp half. At the end opposite the first clamp half, the first flat section merges into a U-shaped formation or V-shaped formation, which extends inward or outward in the direction of the longitudinal axis of the profiled clamp. At the end opposite the first flat section, the bent formation merges into a second flat section. At its opposite end, the second flat section is integrally formed on the second clamp half.

The flat strip section can be prestressed in such a way that the clamp halves are substantially closed with respect to one another, with the result that the two tightening heads lie opposite one another. This facilitates mounting since the two tightening heads can be gripped in a simple manner in order, for example, to close the tightening device with a screw element.

The two tightening heads are connected to one another by a screw element, and therefore the profiled clamp is tightened by tightening the screw element. Tightening is accomplished by means of a nut, for example, preferably a self-locking nut, on a screw element. In the case of a design with a pressure lug, tightening the nut brings the two pressure lugs into contact with one another. The clamping force in the final state is fairly precisely defined by the dimensions of the clamp. Errors due to too low or too high a clamping force cannot occur with the correct design of the clamp.

In one embodiment of the profiled clamp, the first tightening head has a rectangular aperture through which a screw element with a rectangular shoulder of complementary design can be inserted. This prevents rotation of the screw element when it is inserted in the first tightening head. The screw element can be screwed to a nut on the rear side of the second tightening head, the nut being screwed onto the screw element in order to close the tightening device. The screw element is preferably screwed to a self-locking nut.

In order to apply a high closing force by means of the tightening device, pressure lugs are optionally formed on the end sides of the tightening heads, which lugs can come to rest against one another when the screw element is tightened. As a result, in particular, bending of the tightening heads at the transition to the clamp sections is avoided and the tightening heads remain parallel to one another, thereby resulting in better clamping of the tightening heads. The closing force that can be applied by the tightening device can thereby be increased, wherein an increased closing force leads to a greater circumferential force in the tightening heads, which is transmitted by the articulated connection by means of the flat strip section.

The flange parts can optionally have an indentation. The indentation enables the profiled clamp to be positioned on the flange in the direction of rotation, in that a bent formation on the profiled clamp engages in the indentation on the flange. Thus, the profiled clamp cannot rotate on the flange in the circumferential direction, or can rotate only to a very limited extent, as the connecting element of the two tightening heads is being tightened, that is to say, for example, as a screw element is being tightened. Since the bent formation engages in the indentation on the flange, movement of the profiled clamp relative to the flange is prevented.

In one embodiment, a hole is made in the flat strip section. The hole is made in a flat strip section with material thinning. The hole can be round, angular or oval. By means of the hole, positioning of the profiled clamp on the flange in the direction of rotation can be defined in that a projection on the flange assigned to the hole engages in the hole. If the hole is elongate, for example oval, in the circumferential direction, the hole, in conjunction with the projection, offers a certain twisting range, e.g. for adjusting the profiled clamp into position. In addition, an advantage may be achieved that the profiled clamp cannot rotate on the flange in the circumferential direction, or can rotate only to a very limited extent, as the connecting element of the two tightening heads is being tightened, that is to say, for example, as a screw element is being tightened.

In particular, the hole is configured in such a way that it has a dimension of, for example, 3 mm to 8 mm in a main direction, wherein a secondary direction transverse to the main direction is designed to be smaller and has a dimension of, for example, 2 mm to 4 mm. A corresponding projection on the flange, in particular on one of the two flange parts to be connected, can be matched to the dimensions of the hole.

The flat strip section is of flexible design, thus enabling the two clamp halves or the adjacent clamp sections to be moved towards and away from one another. As a result of the embodiment of the articulated connection as a flat strip section with a U-shaped or V-shaped formation, flexural stiffness is reduced, and therefore it is possible for the clamp halves or clamp sections to be bent open and closed relative to one another, preferably without plastic deformations, by means of a preferably elastic deformation of the flat strip section, without the flat strip section being damaged. As a result of the bent formation, the flat strip section has an increased flexibility and/or a defined flexibility adapted to the intended application and can thus be mounted more easily.

Compared with a connecting element used hitherto, for example in the form of a ring with hooked-in ends of the clamp halves, very large circumferential forces can be applied to the clamp sections by way of a one-piece articulated connection with a U-shaped or V-shaped formation or defined thinning, thus enabling the flange parts to be connected to one another with a higher axial force. Furthermore, the production of the profiled clamp is simplified since the clamp sections, the tightening heads and the articulated connection can be produced from a single component starting from a flat strip material without the need to carry out further joining steps. This flat strip material is produced by corresponding punch-bending operations to the two clamp halves with the intermediate flat strip section and the UN-shaped formation or thinning to form the articulated connection or to the three clamp sections with the intermediate flat strip sections and the UN-shaped formation or thinning to form the articulated connections. The profiled clamp offers simple and fast mounting and is designed for high clamping forces.

The profiled clamp can be used for various applications. The profiled clamp is preferably used in the region of turbochargers of motor vehicles. For example, a connection between a turbine housing and a central housing of the turbocharger can be secured with the profiled clamp.

BRIEF DESCRIPTION OF THE FIGURES

Further features, details and advantages of the invention can be derived from the wording of the claims and from the following description of exemplary embodiments with reference to the drawings. In the drawings:

DETAILED DESCRIPTION

Figure 1:
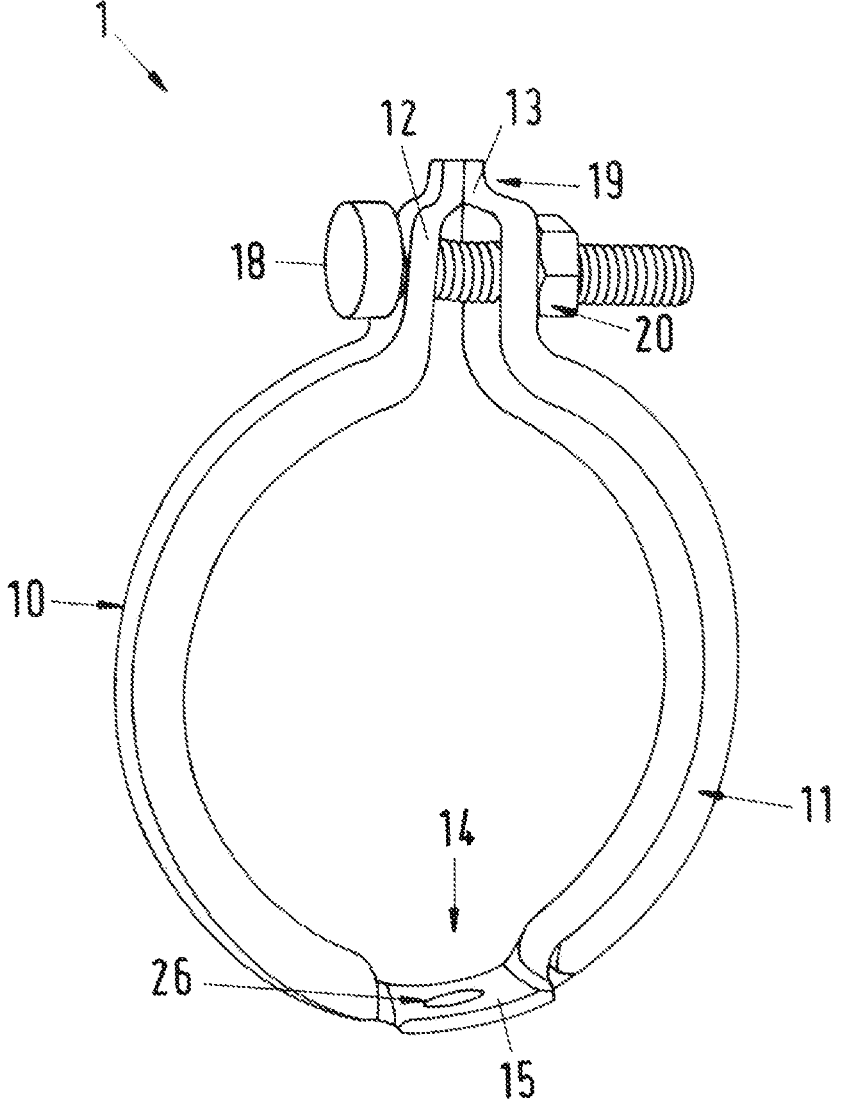
FIG. 1 shows a profiled clamp according to the prior art.

FIG. 1 shows a profiled clamp 1 according to the prior art, as described above.

Figure 2A:
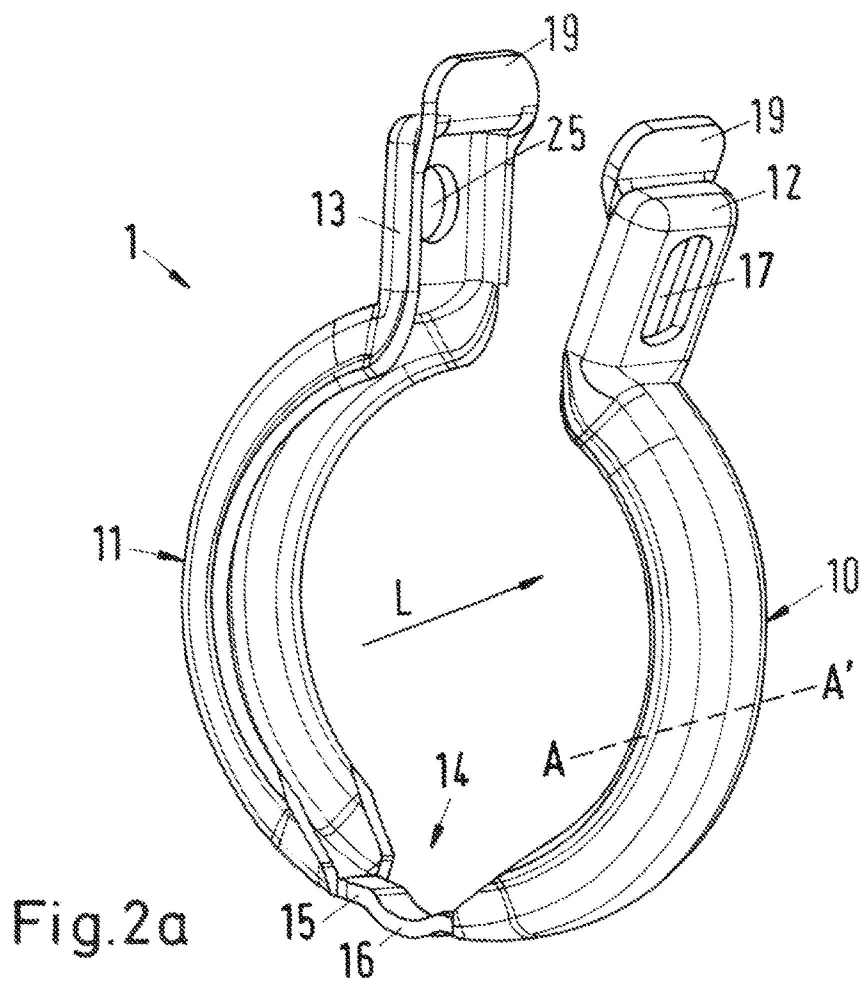
FIG. 2 shows a profiled clamp according to one embodiment.

FIG. 2*a* shows a perspective view of a profiled clamp 1 according to a first embodiment. The profiled clamp 1 has a first clamp half 10 and a second clamp half 11. The clamp halves 10 and 11 are connected to one another in an articulated manner by means of an articulated connection 14. Tightening heads 12 and 13 are integrally formed on the clamp halves 10 and 11. The tightening heads 12 and 13 are integrally formed on the clamp halves 10 and 11, opposite to the articulated connection 14. Through holes are made in the tightening heads 12 and 13, wherein an aperture 17 is formed in the first tightening head 12 and an aperture 25 is formed in the second tightening head 13. At each of the free ends of the first and second tightening heads 12 and 13 there is a pressure lug 19. The two pressure lugs 19 can be brought into contact with one another by tightening a nut on a screw element (neither being illustrated) in order to achieve an improved clamping situation of the clamp halves 10 and 11 with respect to one another.

Figure 2B:
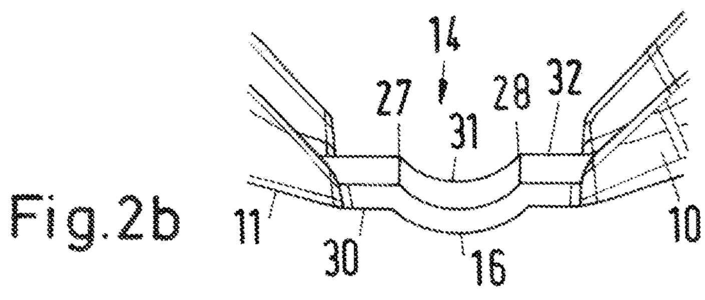
Figure 2C:
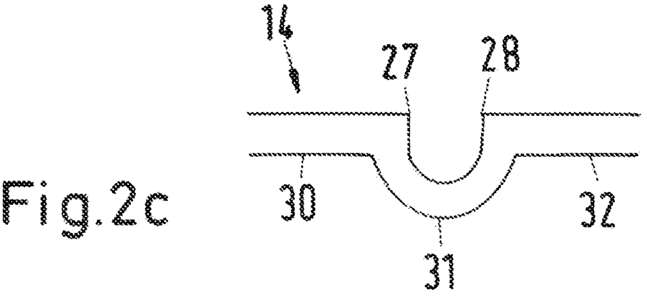

The articulated connection 14 is designed as a flat strip section 15 with a formation 16. The formation 16 is directed axially outward and has a U-shaped cross section. FIG. 2*b* shows an enlarged detail of the profiled clamp from FIG. 2*a* in the region of the articulated connection 14. The flat strip section 15 is integrally formed on the second clamp half 11 by way of a first flat section 30. At the end opposite 27 the first clamp half 10, the first flat section 30 merges into a U-shaped formation 31, which extends outward in the direction of the longitudinal axis L of the profiled clamp 1. At the end 28 opposite the first flat section 30, the U-shaped formation 31 merges into a second flat section 32. At its opposite end, the second flat section 32 is integrally formed on the first clamp half 10. FIG. 2*c* schematically shows the shape of the articulated connection 14 of FIG. 2*b*.

Figure 3A:
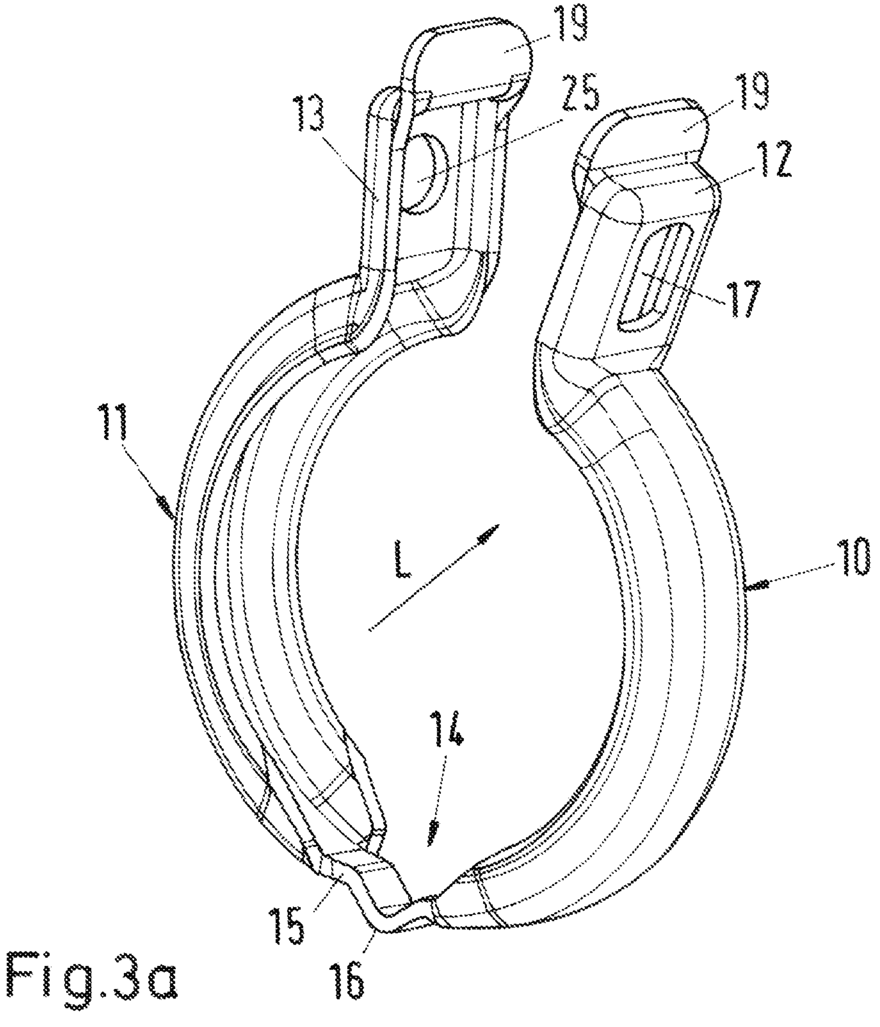
FIG. 3 shows a profiled clamp according to a further embodiment.
Figure 3B:
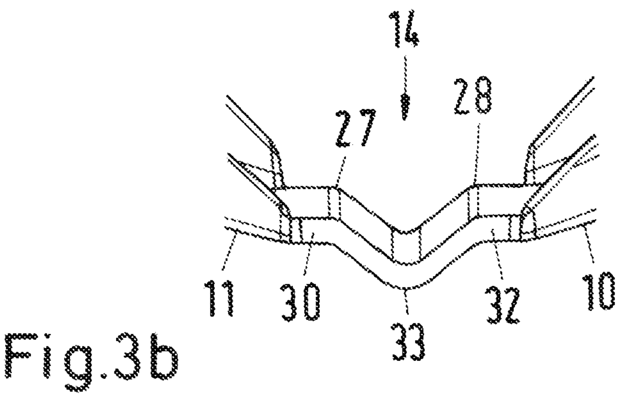

FIG. 3*a* shows a perspective view of a profiled clamp 1 according to a second embodiment. The articulated connection 14 is designed as a flat strip section 15 with a formation 16, which is directed radially outward and has a V-shaped cross section. FIG. 3*b* shows an enlarged detail of the profiled clamp from FIG. 3*a* in the region of the articulated connection 14. The flat strip section 15 is integrally formed on the second clamp half 11 by way of a first flat section 30. At the end 27 opposite the first clamp half 10, the first flat section 30 merges into a V-shaped formation 33, which extends radially outward. At the end 28 opposite the first flat section 30, the V-shaped formation 33 merges into a second flat section 32. At its opposite end, the second flat section 32 is integrally formed on the first clamp half 10.

Figure 4A:
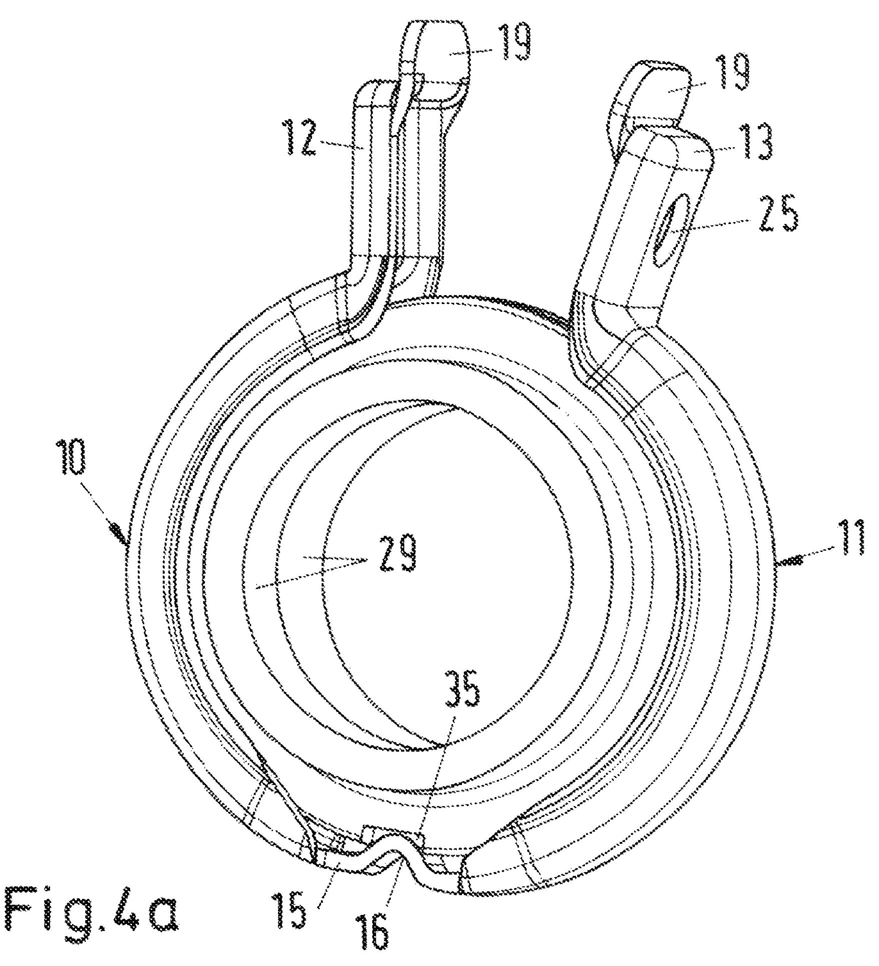
FIG. 4 shows a profiled clamp according to a further embodiment with flange parts.
Figure 4B:
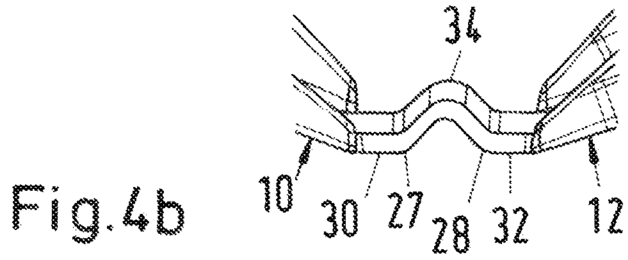

FIG. 4*a* shows a perspective view of a profiled clamp 1 according to a third embodiment. The articulated connection 14 is designed as a flat strip section 15 with a formation 16, which is directed radially inward and has a V-shaped cross section. Arranged in the interior of the profiled clamp 1 are two flange parts 29 of two tubes to be connected, which are surrounded by the clamp halves 10, 11. In the region of the articulated connection 14, the flange has an indentation 35. The indentation 35 is configured as a recess in the flange 29, into which the V-shaped formation 16 engages and thus prevents a movement of the profiled clamp in the circumferential direction relative to the flange. FIG. 4*b* shows an enlarged detail of the profiled clamp from FIG. 4*a* in the region of the articulated connection 14. The flat strip section 15 is integrally formed on the first clamp half 10 by way of a first flat section 30. At the end 27 opposite the first clamp half 10, the first flat section 30 merges into a V-shaped formation 34, which extends radially inward. At the end 28 opposite the first flat section 30, the V-shaped formation 33 merges into a second flat section 32. At its opposite end, the second flat section 32 is integrally formed on the second clamp half 11.

Figure 5:
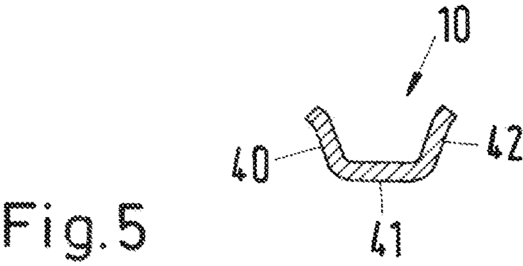
FIG. 5 shows a section through a clamp half.

FIG. 5 shows a section through the first clamp half 10 along the line A-A' in FIG. 2*a*. It can be seen that the clamp half has a trapezoidal profile. The trapezoidal profile is formed by the legs 40 and 42 and the base section 41. Here, the base section 41 connects the two legs 40 and 42 to one another.

Figure 6A:
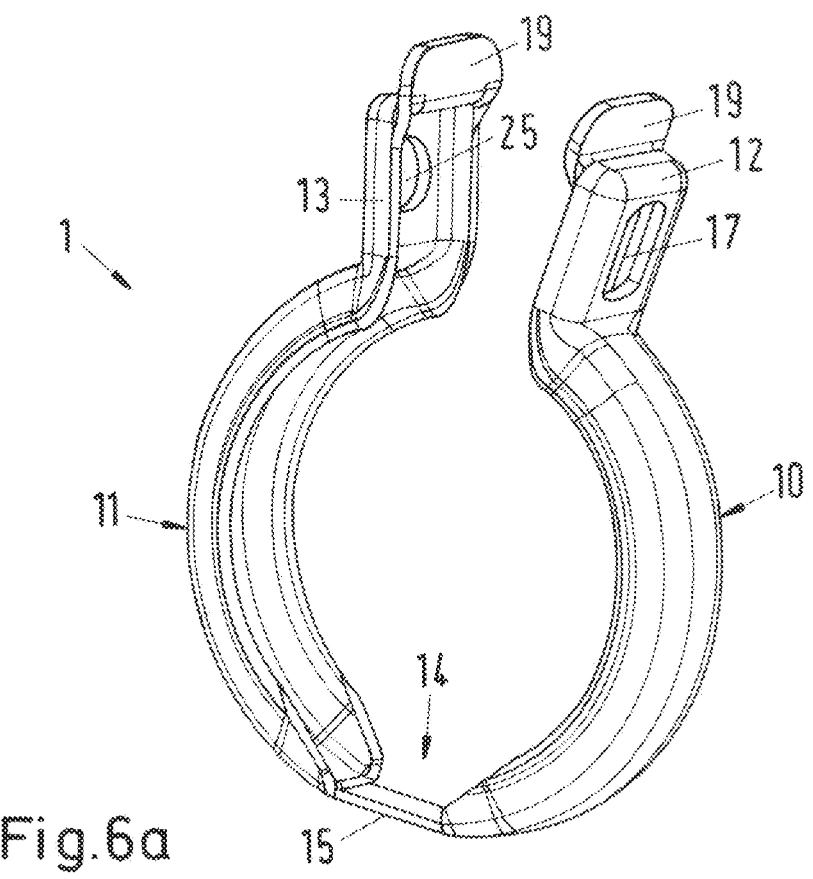
FIG. 6 shows a profiled clamp according to a further embodiment.
Figure 6B:
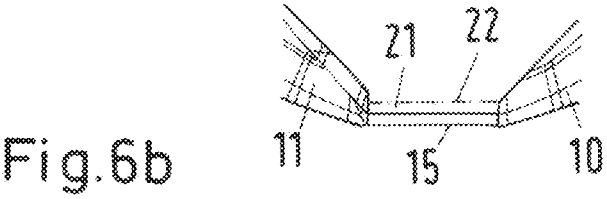
Figure 6C:
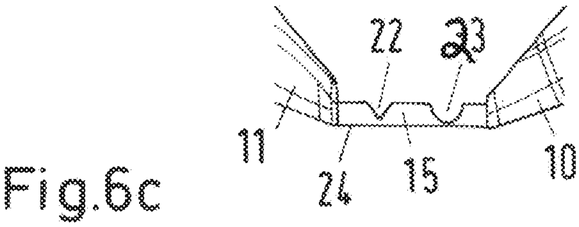

FIG. 6*a* shows a perspective view of a profiled clamp 1 according to a further embodiment. The articulated connection 14 is designed as a flat strip section 15 with a material thinning 21. FIG. 6*b* shows an enlarged detail of the profiled clamp from FIG. 6*a* in the region of the articulated connection 14. The flat strip section 15 has a low material thickness relative to the clamp halves. The dashed line 22 illustrates the material thickness of the clamp half and serves only to illustrate the material thinning 21. In the form shown, the material thinning extends over the entire length of the flat strip section 15. Alternatively, the material thinning can also be in the form of a U-shaped or V-shaped cross section and not extend over the entire length of the flat strip section. The specific material thinning can be introduced both in the direction of the radially inwardly or radially outwardly directed side of the flat strip section. FIG. 6*c* shows an alternative embodiment of the flat strip section 15 with material thinning. The flat strip section in FIG. 6*c* has two material thinnings arranged adjacent to one another, a notch 22 with a V-shaped cross section and a notch 23 with a U-shaped cross section. The notches are each embodied as transverse grooves, transversely to the circumferential direction of the clamp, over the entire material width of the flat strip section.

Figure 7A:
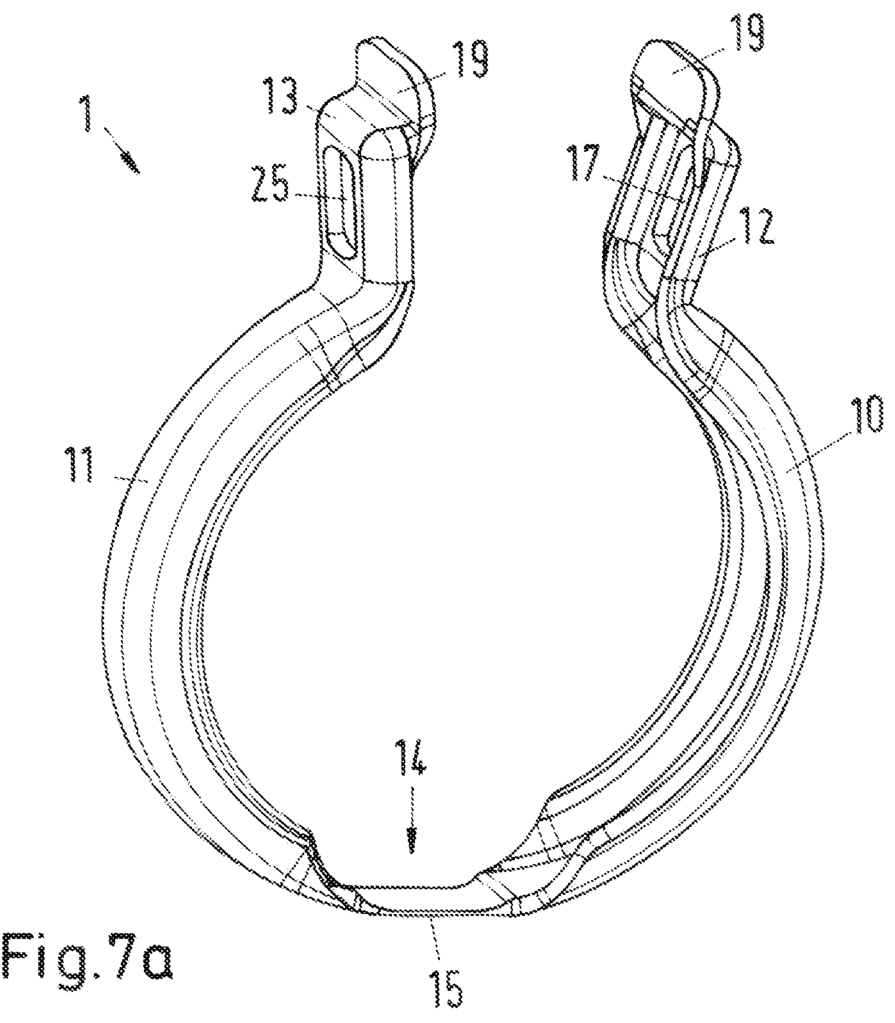
FIG. 7 shows a profiled clamp according to a further embodiment.
Figure 7B:
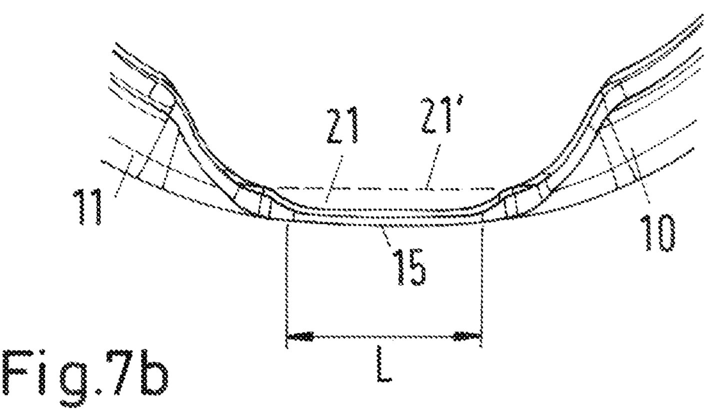
Figure 9:
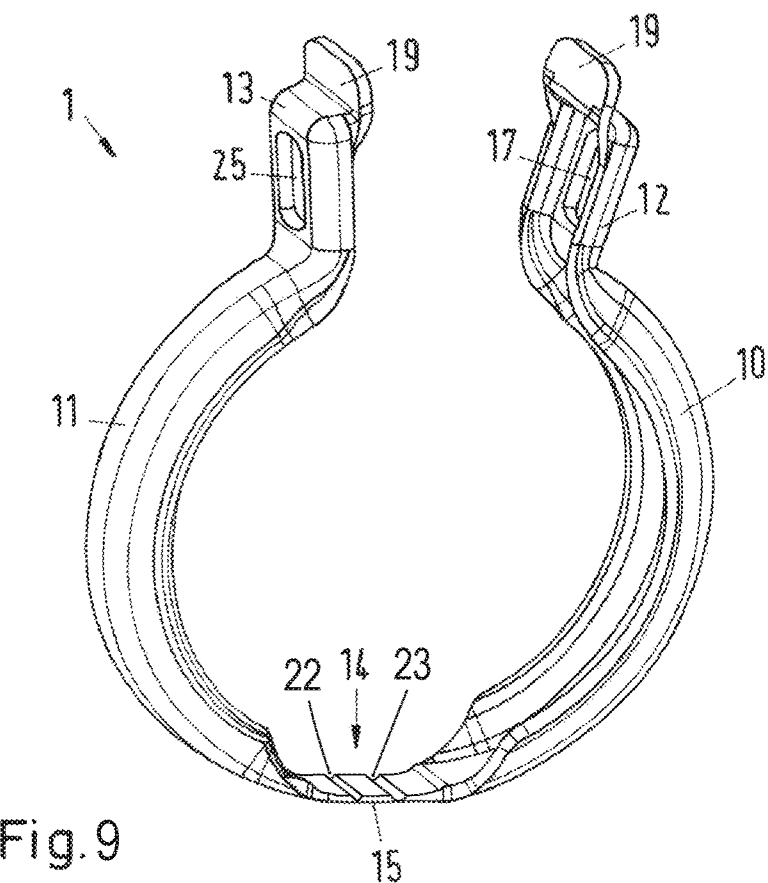
FIG. 9 shows a profiled clamp according to a further embodiment.

FIG. 7*a* shows a perspective view of a profiled clamp 1. . . . The material strip section 15 in FIGS. 7*a* and 7*b* is therefore longer than the thinned material strip section in FIGS. 6*a* and 6*b*. FIG. 9 shows a perspective view of a profiled clamp 1 showing the flat strip section 15 having a notch with a U-shaped or V-shaped cross section 22, 23, by means of which the reduced material thickness was produced wherein the notch 22, 23 extends transversely to the circumferential direction of the clamp 1 over an entire material width of the flat strip section 15. The notch 22, 23 does not penetrate the sheet thickness but takes material from an upper side of the flat strip section and thereby thins it additionally, such that an underside of the flat strip section 15 has no notches.

Figure 8:
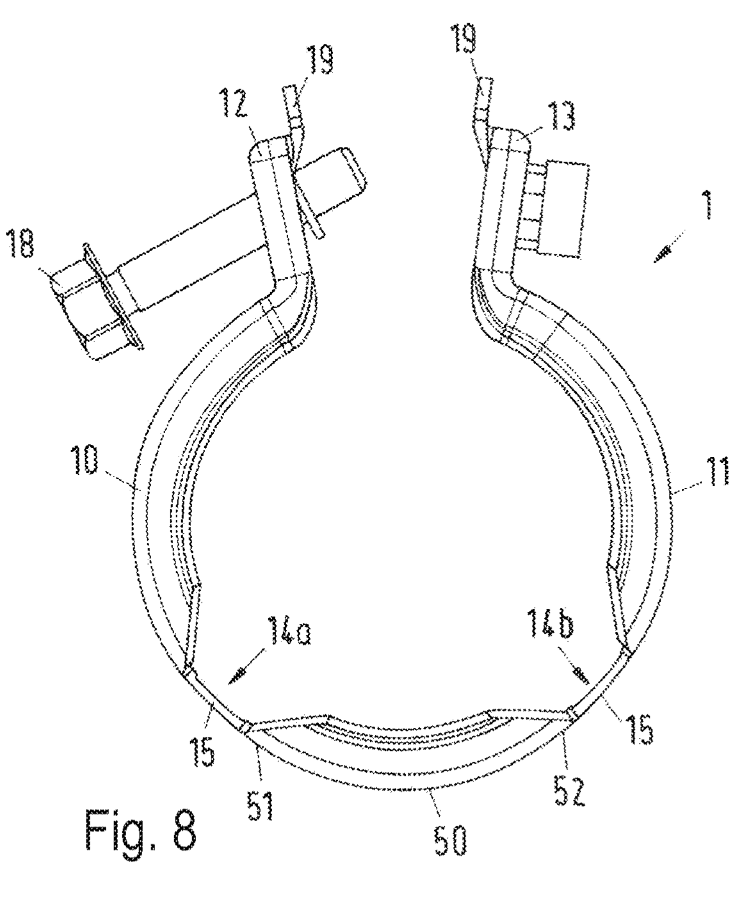
FIG. 8 shows a profiled clamp according to a further embodiment.

FIG. 8 shows a perspective view of a profiled clamp 1 according to a further embodiment with three clamp sections. The profiled clamp 1 has a first profiled clamp section 10, a second profiled clamp section 11 and a third profiled clamp section 50. The first clamp section 10 is connected in an articulated manner to the third clamp section 50 at the first end 51 of the latter by a first articulated connection 14*a*. The second clamp section 11 is connected in an articulated manner to the third clamp section 50 at the second end 52 of the latter by a second articulated connection 14*b*. The tightening heads 12 and 13 are integrally formed on the clamp halves 10 and 11, opposite to the third clamp section 50. Through holes are made in the tightening heads 12 and 13, wherein an aperture 17 is formed in the first tightening head 12 and an aperture 25 is formed in the second tightening head 13. At each of the free ends of the first and second tightening heads 12 and 13 there is a pressure lug 19. The two pressure lugs 19 can be brought into contact with one another by tightening a nut 20 on a screw element 18 in order to achieve an improved clamping situation of the clamp halves 10 and 11 with respect to one another. The two articulated connections 14*a*, 14*b* are designed as a flat strip section 15 with a material taper 21.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

The invention is not restricted to one of the above-described embodiments but can be modified in a variety of ways. All the features and advantages which emerge from the claims, the description and the drawing, including design details, spatial arrangements and method steps, may be essential to the invention either per se or in a wide variety of combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 profiled clamp
10 first clamp half
11 second clamp half
12 first tightening head
13 second tightening head
14 articulated connection
15 flat strip section
16 formation
17 aperture
18 screw element
19 pressure lug
20 self-locking nut
21 material thinning
22 notch, V-shaped
23 notch, U-shaped
24 edge, underside
25 aperture
27 end of the first flat section
28 end of the second flat section
29 flange part
30 first flat section
31 U-shaped formation
32 second flat section
33 V-shaped formation
34 U-shaped formation
35 indentation
40 leg
41 base section
42 leg
50 third clamp section
51 first end of the clamp section
52 second end of the clamp section

The invention claimed is:

1. A profiled clamp having a first profiled clamp section and having a second profiled clamp section, by means of which two flange parts can be connected to one another with the application of an axial force, wherein a first tightening head is formed at one end of the first profiled clamp section and a second tightening head is formed at one end of the second profiled clamp section in order to form a tightening device, wherein the ends of the first and second profiled clamp sections which are located opposite the tightening heads are connected to one another via an articulated connection, wherein the articulated connection is formed via a mechanically machined or formed flat strip section which is connected in one piece to the first and second clamp sections and has a defined flexibility, wherein the flat strip section has a reduced material thickness in a sheet thickness direction, when compared with the first and second clamp sections, wherein the flat strip section has at least one notch with a U-shaped or V-shaped cross section, by means of which the reduced material thickness was produced, wherein the at least one notch is embodied as a transverse groove;

wherein the at least one notch extends transversely to the circumferential direction of the clamp over an entire material width of the flat strip section, wherein the flat strip section has an upper side directed toward a center of the profiled clamp and an underside directed away from the center of the profiled clamp, wherein the at least one notch does not penetrate the sheet thickness but takes material from the upper side of the flat strip section and thereby thins it additionally, such that the underside of the flat strip section remains unchanged and has no notches.

2. The profiled clamp as claimed in claim 1, wherein the profiled clamp has two profiled clamp sections as profiled clamp halves, and the first profiled clamp section is a first profiled clamp half, and the second profiled clamp section is a second profiled clamp half, and the ends of the first and second profiled clamp halves which are located opposite the tightening heads are connected to one another via the articulated connection.

3. The profiled clamp as claimed in claim 1, further comprising a third profiled clamp section, and the first profiled clamp section is connected to a first end of the third profiled clamp section via a first articulated connection at the end of the first profiled clamp section which is located opposite the tightening head, and the second profiled clamp section is connected to a second end of the third profiled clamp section via a second articulated connection at the end of the second profiled clamp section which is located opposite the tightening head.

4. The profiled clamp as claimed in claim 1, wherein the flat strip section has a stamped feature or milled feature or rolled feature, by means of which the reduced material thickness was produced.

5. The profiled clamp as claimed in claim 1, wherein pressure lugs are formed on the end sides of the tightening heads, which pressure lugs come to rest against one another when a screw element is tightened.

6. The profiled clamp as claimed in claim 5, wherein the screw element is screwed to a self-locking nut.

7. The profiled clamp as claimed in claim 1, wherein the first tightening head has a rectangular aperture through which a screw element with a rectangular shoulder of complementary design can be inserted.

8. The profiled clamp as claimed in claim 1, further comprising at least one further profiled clamp section, the at least one further profiled clamp section connected to adjacent profiled clamp sections via articulated connections.

9. The profiled clamp as claimed in claim 1, wherein the reduced material thickness of the flat strip section is in the sheet thickness direction, transverse to a circumferential direction.

10. The profiled clamp as claimed in claim 1, wherein the reduced material thickness of the flat strip section, which forms the articulated connection, extends over the entire length of the flat strip section or is arranged centered in the circumferential direction of the clamp sections.

11. The profiled clamp as claimed in claim 1, wherein the flat strip section has no profiling and is flat transversely to the circumferential direction of the clamp sections, wherein longitudinal sides of the flat strip section are not bent relative to one another, such that the flat strip section is built flat in the axial direction.

* * * * *